(12) United States Patent
Loheide et al.

(10) Patent No.: US 8,807,543 B2
(45) Date of Patent: Aug. 19, 2014

(54) ELASTOMERIC PLAIN BEARING HAVING SWITCHABLE RIGIDITY

(75) Inventors: Stefan Loheide, Wallenhorst (DE); Hubert Siemer, Dinklage (DE); Thomas Conrad, Treuchtlingen (DE)

(73) Assignee: Audi AG, Ingolstadt (DE)

( * ) Notice: Subject to any disclaimer, the term of this patent is extended or adjusted under 35 U.S.C. 154(b) by 113 days.

(21) Appl. No.: 13/254,369

(22) PCT Filed: Mar. 15, 2010

(86) PCT No.: PCT/DE2010/050012
§ 371 (c)(1),
(2), (4) Date: Sep. 1, 2011

(87) PCT Pub. No.: WO2010/108490
PCT Pub. Date: Sep. 30, 2010

(65) Prior Publication Data
US 2012/0038093 A1 Feb. 16, 2012

(30) Foreign Application Priority Data
Mar. 23, 2009 (DE) .......................... 10 2009 001 757

(51) Int. Cl.
*F16F 5/00* (2006.01)
(52) U.S. Cl.
USPC ................................ 267/140.12; 267/140.15
(58) Field of Classification Search
USPC ............... 267/140.11, 140.12, 140.15, 140.3, 267/140.4, 140.5, 141.1, 141.2, 292, 293, 267/294
See application file for complete search history.

(56) References Cited

U.S. PATENT DOCUMENTS

| | | | | |
|---|---|---|---|---|
| 4,687,223 A | * | 8/1987 | Miyoshi et al. | 280/5.516 |
| 4,702,346 A | | 10/1987 | Uno et al. | |
| 4,728,086 A | | 3/1988 | Ishiyama et al. | |
| 4,858,899 A | * | 8/1989 | Saotome et al. | 267/219 |
| 4,909,489 A | | 3/1990 | Doi | |
| 4,951,930 A | * | 8/1990 | Uno et al. | 267/293 |
| 5,050,850 A | * | 9/1991 | Noguchi et al. | 267/140.12 |

(Continued)

FOREIGN PATENT DOCUMENTS

| | | |
|---|---|---|
| DE | 3731004 A1 | 3/1988 |
| DE | 3910447 A1 | 10/1989 |

(Continued)

OTHER PUBLICATIONS

English-language abstract of JP 05-280579.*

(Continued)

*Primary Examiner* — Bradley King
*Assistant Examiner* — Nicholas J Lane
(74) *Attorney, Agent, or Firm* — Norris McLaughlin & Marcus, P.A.

(57) ABSTRACT

A bearing body (2) is divided in the radial direction (r) by at least one insert (6) arranged in the bearing body (2) parallel to the bearing axis (12) into at least two spring packets (7, 8) having an outer switching packet (8). Each of the working chambers (4, 4') is divided into several chamber sections ($9_1$-$9_n$) extending in the radial direction (r) and into at least one chamber section (10) extending in the axial direction (a) and connecting the chamber sections ($9_1$-$9_n$) with one another. The elastomeric bearing body (2) is segmented in the switching packet (8) in the axial direction (a) by the chamber sections ($9_1$-$9_n$) protruding into the elastomeric bearing body (2).

12 Claims, 3 Drawing Sheets

(56) References Cited

U.S. PATENT DOCUMENTS

Figure 1:
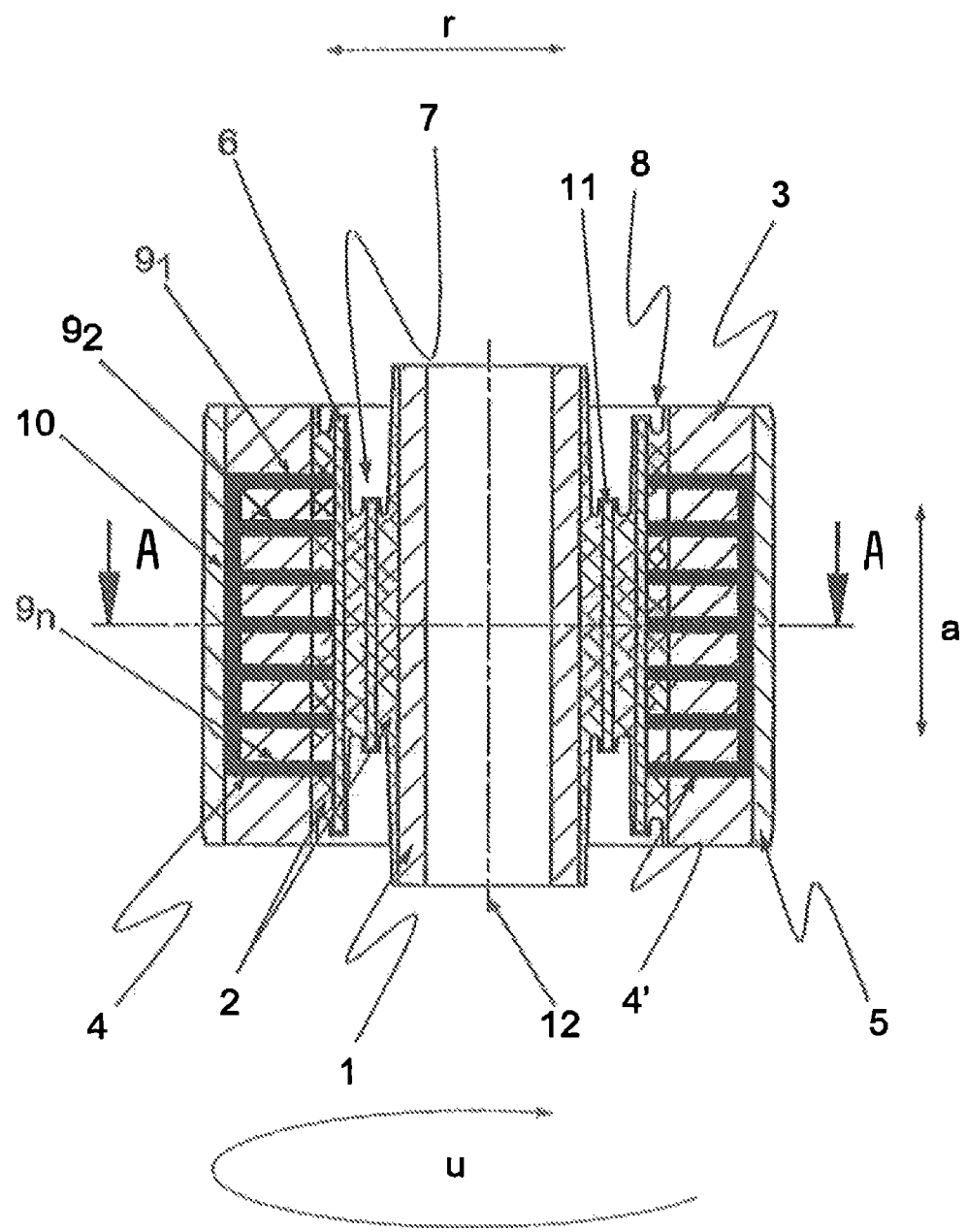

| | | | |
|---|---|---|---|
| 5,299,788 A | 4/1994 | Kanda | |
| 5,577,771 A * | 11/1996 | Lee | 280/5.52 |
| 6,007,072 A * | 12/1999 | Yoon | 280/5.514 |
| 2002/0185797 A1 | 12/2002 | Someya et al. | |
| 2006/0220448 A1 | 10/2006 | Haertel et al. | |
| 2006/0279029 A1* | 12/2006 | Souyri | 267/140.12 |
| 2009/0057968 A1* | 3/2009 | Loheide et al. | 267/140.14 |
| 2009/0127044 A1 | 5/2009 | Eberhard | |

FOREIGN PATENT DOCUMENTS

| | | | | | |
|---|---|---|---|---|---|
| DE | 10049140 | A1 | | 4/2002 | |
| DE | 10252188 | A1 | | 5/2004 | |
| DE | 10330877 | A1 | | 1/2005 | |
| DE | 102005028563 | A1 | | 1/2007 | |
| DE | 102006040958 | A1 | | 3/2008 | |
| DE | 102006040985 | A1 | | 3/2008 | |
| EP | 0335007 | A2 | | 10/1989 | |
| EP | 1705400 | A1 | | 9/2006 | |
| FR | 2555688 | A1 | | 5/1985 | |
| JP | 60172743 | A | | 9/1985 | |
| JP | 61-270533 | | | 11/1986 | |
| JP | 61270533 | A | | 11/1986 | |
| JP | 62-056639 | | | 3/1987 | |
| JP | 62056639 | A | | 3/1987 | |
| JP | 62167949 | A | | 7/1987 | |
| JP | 63158333 | A | * | 7/1988 | ............. F16F 13/00 |
| JP | 01-193431 | | | 8/1989 | |
| JP | 1193431 | A | | 8/1989 | |
| JP | 05280579 | A | * | 10/1993 | ............. F16F 13/00 |

OTHER PUBLICATIONS

English-language Abstract of JP 63-158333 (No Date).*
International Search Report dated Jul. 7, 2010.

* cited by examiner

_US 8,807,543 B2_

ELASTOMERIC PLAIN BEARING HAVING SWITCHABLE RIGIDITY

This is an application filed under 35 USC §371 of PCT/DE2010/050012, claiming priority to DE 102009 001 757.1 filed on Mar. 23, 2009.

BACKGROUND OF THE INVENTION (1) Field of the Invention

The invention relates to an elastomeric bush or plain bearing with a changeable radial rigidity or stiffness. The bearing can be switched between a state with a rather low stiffness and a state with a comparatively higher stiffness. The bearing consists substantially of a preferably tubular metallic inner part, a cylindrical outer part and an elastomeric bearing body arranged between the inner part and the outer part and connected at least with the inner part by vulcanization, and a bearing sleeve receiving the aforementioned elements of the bearing. At least two chambers for receiving a fluid are arranged in the bearing body.

(2) Description of Related Art

Elastomeric bush bearings are widely employed in particular in the automotive industry and are preferably used for supporting parts of the chassis. With respect to the driving comfort, high demands are placed on the bearing because they should keep away vibrations caused by uneven road surfaces from the passenger compartment and also insulate the passenger compartment to the greatest possible extent from noise originating from the vehicle units. Because of these resilient and damping characteristics, the bearings are of great importance and should also offer the largest possible degree of safety in dangerous situations as well as support the elasto-kinematics.

Because both low-frequency oscillations caused by uneven road surfaces and high-frequency acoustic vibrations caused by the vehicle units need to be effectively attenuated, the properties of the bearing can be adapted to different requirements by varying the geometry and the hardness of the elasticity of the bearing body (generally rubber). The passive embodiments of the bearings currently most widely used in series production attempt to achieve a compromise for attenuating vibrations of different frequencies. However, a more advantageous approach is to construct the bearings actively, i.e., to make it possible to switch the stiffness characteristic using suitable constructive measures for an automatic adaptation to the corresponding driving and road situation, based on various information from the vehicle.

In a possible approach for switching the stiffness of conventional bush bearings, the bearings are forcefully constricted in the axial direction to achieve the transition into a state of high stiffness. To this end, the bearing geometry, in particular the bearing body, is acted on by applying suitable electric or hydraulic means in the axial direction. Bush bearings of the aforedescribed type are described, for example, in DE 10 2006 040 958 A1 and DE 10 100 49 140 A1. Another possibility is to reduce the clearance of the bearing in the operating direction and to thereby temporarily increase the stiffness. For example, electric switching means are employed for this purpose, with corresponding examples disclosed in DE 10 2005 028 563 A1 and DE 103 30 877 A1.

The bearings constructed according to the aforementioned documents require comparatively high power for switching their stiffness characteristic, because the bearing must always be moved to a defined position when changing the stiffness, independent of its actual orientation or position.

The power required for switching the stiffness can be lowered with embodiments of elastomeric bearings that deviate from the basic principle where the bearing is secured in a predetermined position. This is achieved with bearings having at least two chambers that are filled with a fluid and connected with one another by a channel. The stiffness can be switched by alternatingly allow or prohibit fluid exchange between the chambers. Due to the incompressibility of the fluid, a high radial stiffness is produced in the region of a chamber filled with the fluid while fluid exchange is blocked, whereas the radial stiffness in the region of the other chambers emptied of the fluid is small due to the elasticity of the elastomeric bearing body or the rubber, respectively.

Several documents of the state-of-the-art disclose that the viscosity of the fluid may be changed during the switching process by alternatingly allowing or suppressing a fluid exchange between two chambers. For example, DE 39 10 447 A1 describes a solution where the fluid is an electro-rheological fluid whose viscosity is changed by suitable switching processes with electrodes projecting into the damping means or into the chambers receiving the damping means. As another possibility described, for example, in EP 1 705 400 A1 a magneto-rheological fluid can be used by changing its viscosity by applying different magnetic fields to the fluid. In the aforementioned solutions, the described stiffening mechanisms typically operate in parallel with the stiffness of the bearing body and the support body, respectively. However, the same effect could also be realized with a series connection. The latter solutions mentioned above are all based on a common principle to increase the stiffness by preventing the movement of the elastomer forming the bearing body by way of the incompressibility of the damping means and the fluid, respectively. Disadvantageously, very high pressures build up in the damping means chambers, which adversely affect the durability of the bearings.

It is an object of the invention to provide an alternative solution for an elastomeric bush bearing having a switchable stiffness. The intent is to obviate the aforementioned disadvantages of the state-of-the-art by designing the bearing so as to require neither high power for ensuring its switchability, nor adversely affecting its endurance by high stress on its elements.

BRIEF SUMMARY OF THE INVENTION

This object is solved by an elastomeric bush bearing having the features of the independent claim. Advantageous embodiments and modifications of the bush bearing according to the invention are recited in the dependent claims. The bush bearing proposed for solving the object consists, as generally known, of a cylindrical metallic inner part, a tubular outer part surrounding the inner part, and an elastomeric bearing body arranged between the inner part and the outer part and connected with the inner part and the outer part by vulcanization, and a bearing sleeve receiving the aforementioned parts. At least one chamber pair with two working chambers for receiving a fluid is formed in the bearing, wherein the working chambers are arranged with an offset in the circumferential direction of the bearing. For switching the stiffness of the bearing, at least one actuator 20 (as shown in FIGS. 3-6) is provided which allows the inflow f1 of damping means 22 into at least one of the working chambers and outflow f2 of damping means 22 from at least one of the working chambers to be blocked or unblocked by a switching process, thereby changing the radial stiffness in the region of the working chambers. With the bush bearing including, as mentioned above and characterized in the independent claim, at least one pair of working chambers, this embodiment also includes the possibility of optionally forming several such chamber pairs in the bearing. For example, bush bearings having a large axial length may have several chamber pairs arranged with an offset in the axial direction, wherein however the chambers of each pair are arranged with an offset in the circumferential direction of the bearing. Alternatively, several chamber pairs may be arranged in the circumferential direction of the bearing. The following description generally relate to an embodiment most relevant for practical applications with one chamber pair having two working chambers arranged with an offset in the circumferential direction of the bearing, without limiting the principle underlying the solution according to the invention.

According to the invention, the bearing body of the bush bearing solving the object is divided in the radial direction by at least one insert arranged in the bearing body parallel to the bearing axis into at least two spring packets. Because the radially outer switching packet receives the working chambers, it is implemented as a switching packet. In a manner important within the context of the invention, each of the working chambers is divided into several chamber sections extending in the radial direction inside the bearing body and the outer part and into at least one chamber section extending in the axial direction and connecting the chamber sections with one another. The elastomeric bearing body is segmented in the axial direction in the switching packet, which is bounded by the insert and the outer part, by the chamber sections of the working chambers protruding into the elastomeric bearing body. Preferably, all radially extending chamber sections are connected with one another by a chamber section which extends axially inside the outer part. In a generally feasible embodiment according to the general principle of the solution, which would be more difficult to manufacture, radially extending and axially extending chamber sections may be connected to one another in a meander pattern.

Figure 3:
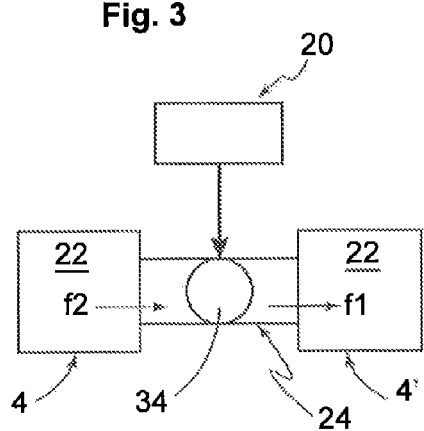
Figure 4:
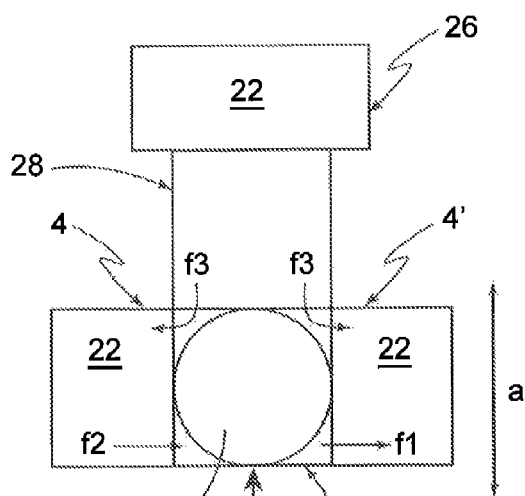

The invention is based on the concept that the stiffness increases with the ratio between the bound and the free surface of the elastomer. The fact that rubber and comparable elastomers are incompressible plays an important role. When the working chamber does not contain fluid, the free surface of the elastomer is determined in the region of this chamber by the outer end faces of the segments of the elastomeric bearing body formed in the switching packet. When the elastomer is deflected, it can move out of the way into the free spaces formed by the chamber sections of the respective working chamber which project into and segment the bearing body. The stiffness in the region of this working chamber is hereby comparatively small. However, when the working chamber is filled with a fluid and hence with an incompressible medium, the elastomer can no longer move into the aforementioned intermediate spaces. Instead, both the elastomer of the segments of the bearing body as well as the fluid tend to expand, in competition with one another, into the free spaces formed by the radially extending chamber sections of the working chambers under radial load. The segments and the elastomeric webs, respectively, between the radial chamber sections of the working chambers are supported on both sides by the pressure of the fluid, causing small expansions in the elastomer in the region of these segments. However, the spreading or changeability of the radial stiffness that can be attained for a defined chamber pressure in the region of the corresponding working chamber increases with increasing ratio of the free surface of the elastomer before and after a working chamber has been filled with the fluidic damping means 22 (as shown in FIGS. 3 and 4). This also implies: the greater the ratio of the free surfaces before and after the working chamber is filled with the fluid at the required stiffness spreading, the smaller is the expected chamber pressure. With the structure of the working chambers according to the invention and the segmentation of the bearing body then attained in the switching packet, the available free surface of the elastomer is increased. As a result, as described above, the load of the elastomer is relatively small even at a high stiffness spreading, thus improving the endurance and/or the durability of the bearing.

Figure 5:
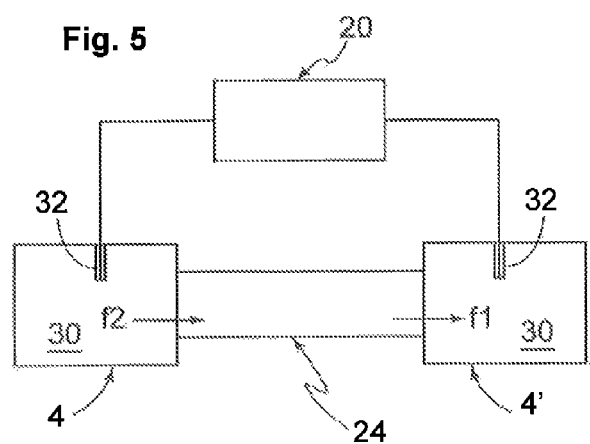

In another possible embodiment of the bearing according to the invention, the stiffness of the bearing can be switched by blocking or temporarily unblocking a channel 24 (as shown in FIGS. 3-5) that connects the working chambers 4, 4' (as shown in FIGS. 3-5) with one another. According to another embodiment, the fluid exchange between the working chambers 4, 4' and at least one additionally provided equalization chamber 26 with a high volume yieldability which is arranged axially below and/or above (as shown in FIG. 4) the working chambers 4, 4', can be blocked or temporarily unblocked by a switching process. The aforementioned equalization chamber(s) 26 is/are chambers, comparable to the equalization chambers known from engine mounts, having a greater volume than the working chambers 4, 4'. Due to the comparatively large volume of an equalization chamber 26, fluid which flows from one working chamber 4 or 4' into the equalization chamber 26 does basically not increase the chamber pressure of the equalization chamber 26. Conversely, fluid flowing into the working chambers 4, 4' immediately increases the pressure in the working chambers 4, 4'. By automatically blocking and temporarily unblocking the channels 24, 28 (as shown in FIG. 4) connecting the equalization chamber(s) 26 with the working chambers 4, 4', for example when used in an automobile, depending on the driving and/or load situation based on information from the vehicle, a bush bearing formed in this manner can change between two basic switching states. In the first switching state of the bush bearing, the inflow f3 (as shown in FIG. 4) of fluid from the respective equalization chamber 26 is blocked for both working chambers 4, 4'. The bush bearing has in this switching state, where the working chambers 4, 4' are emptied of fluid, a small radial stiffness. Conversely, the bush bearing has a high radial stiffness in a second switching state, where the outflow of fluid into the equalization chamber is blocked for both working chambers 4, 4' filled with fluid.

Figure 6:
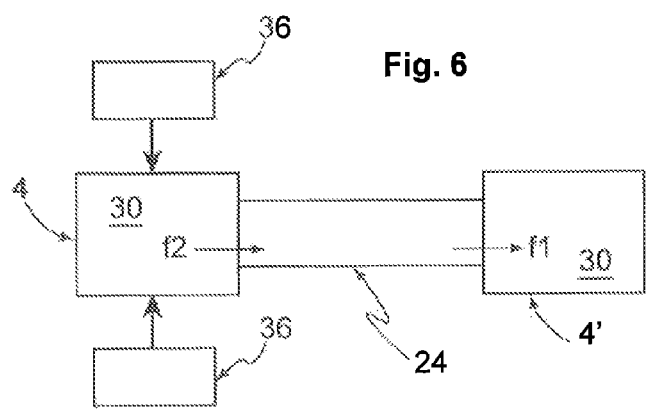

The inflow f1 of fluid into a chamber and the outflow f2 of fluid from a chamber can be blocked or unblocked in different ways. Preferably, a switchable valve 34 is arranged in the channel 24 connecting the working chambers 4, 4' with each other or in the channel(s) 24, 28 connecting the working chambers 4, 4' and the equalization chamber(s) 26. However, an electro-rheological or a magneto-rheological fluid could also be used as fluidic damping means 30 (as shown in FIG. 5, wherein the viscosity of the fluidic damping means 30 can be changed by connecting electrodes 32 protruding into the damping means 30 or with magnetic actuators 36 operating on the damping means 30 (as shown in FIG. 6), thereby allowing the fluid to pass through or be blocked from passing through one of the aforementioned channels 24, 28.

The channel formed between the working chambers or the channel connecting the working chambers with an equalization chamber preferably have a considerable width compared to their length, so that the respective channel with the yieldability of the working chambers goes into resonance as late as possible, i.e., at higher frequencies, to prevent frequencies in the acoustic range caused by stiffness in or on a channel from being transmitted hard. According to a particularly advantageous embodiment of a bush bearing formed with at least one compensation chamber having high volume yieldability, comparable with the chamber of an engine mount, the ratio between the channel width and the length of the channel connecting the equalization chamber with a working chamber is preferably equal to 1 or greater.

According to a feasible improvement of the invention, additional inserts, which also extend in the axial direction, or intermediate plates, may be arranged in the elastomer of the inner spring packet operating as working packet. In this way, the shear stiffness becomes relatively small in spite of a high compressive stiffness.

BRIEF DESCRIPTION OF THE SEVERAL VIEWS OF THE DRAWING(S)

Figure 2:
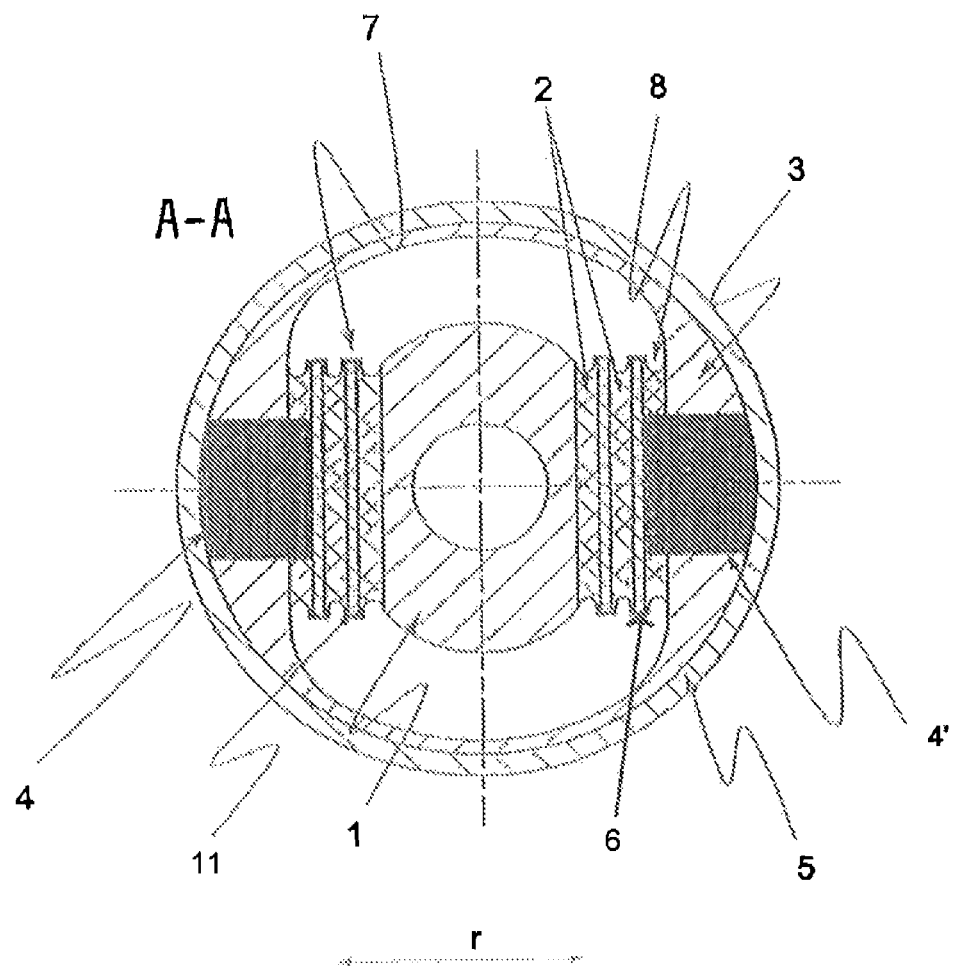

Details of the aforedescribed invention will now be described again with reference to the drawings. The drawings show in detail in:

FIG. 1 a bush bearing constructed according to the invention in an axial cross-sectional view, and FIG. 2 the bush bearing according to FIG. 1 in a radial cross-sectional view taken along the line A-A.

FIG. 3 working chambers connected by a channel having a switchable valve and actuator according to an embodiment of the present invention in a schematical view.

FIG. 4 working chambers and an equalization chamber connected by channels having a switchable valve and actuator according to an embodiment of the present invention in a schematical view.

FIG. 5 working chambers connected by a channel having electrodes and an actuator according to an embodiment of the present invention in a schematical view.

FIG. 6 working chambers connected by a channel having magnetic actuators according to an embodiment of the present invention in a schematical view.

DETAILED DESCRIPTION OF THE INVENTION

FIG. 1 shows a cross-sectional view of an elastomeric bush bearing constructed according to the invention, wherein the actuators 29 for switching the stiffness are shown in FIGS. 3-5. The drawing is only intended to once more describe the particular geometry of the bearing constructed according to the invention and more particularly describe the special configuration of the working chambers 4, 4'. The bearing includes the metallic inner part 1, the elastomeric bearing body 2, the preferably also metallic outer part 3, and the likewise preferably metallic bearing sleeve 5 receiving the aforementioned parts. The elastomeric bearing body 2 is arranged between the inner part 1 and the outer part 3 and connected with the therewith by the vulcanization. Furthermore, an intermediate plate 6 which extends parallel to the bearing axis 12 is vulcanized into the bearing body 2, dividing the bearing body into two spring packets 7, 8. The inner spring packet 7 operates as a working packet, whereas the outer spring packet 8, which receives the working chambers 4, 4' with the fluid and which is delimited by the intermediate plate 6 and the outer part 3, operates as switching packet for changing the stiffness.

Of particular importance is the specific design of the working chambers 4, 4', which consist each of a plurality of chamber sections $9_1$-$9_n$ extending in the radial direction r, which are connected with each other by a chamber section 10 extending in the axial direction a. The radial chamber sections $9_1$-$9_n$ extend through the outer part 3 and protrude into the elastomer of the bearing body 2 in form of a comb, delimited by the intermediate plate 6. As seen from the FIG. 1, the elastomeric bearing body is segmented in the axial direction a in the region of the switching packet 8. This increases the free surface of the elastomer, resulting in only a comparatively small pressure in the respective working chamber 4, 4' even with a predetermined high stiffness spreading (meaning a large difference between the stiffness in the unfilled state of a working chamber 4, 4' and the stiffness when the working chamber 4, 4' is filled with a fluid). To enable switching, the two working chambers 4, 4' are preferably connected with one another by a channel 24 (as shown in FIGS. 3-5) in which a valve 24 is arranged. Alternatively, a volume-yielding expansion chamber 26 having a connecting channel 28 to the working chambers 4, 4' and a switchable valve 34 arranged in the channel 24 may be arranged axially above (as shown in FIG. 4) and/or below (not shown in the drawings) the working chambers 4, 4'. In the bush bearing illustrated in the FIG. 1, an additional insert 11 or an intermediate plate, respectively, is inserted in the region of the inner spring packet 7, i.e., the working packet. This additional insert 11 reduces the shear stiffness.

FIG. 2 shows the bearing constructed according to the invention in accordance with FIG. 1 once more in an axial cross section, wherein the section is taken along the line A-A of FIG. 1.

The invention claimed is:

1. An elastomer bush bearing with a stiffness switchable in a radial direction (r), with a cylindrical metallic inner part (1), a tubular outer part (3) surrounding the inner part, an elastomeric bearing body (2) arranged between the inner part (1) and the outer part (3), and at least one pair of working chambers (4, 4'), arranged with an offset in relation to a circumferential direction (u) of the bush bearing, for receiving a fluid, as well as a bearing sleeve (5) receiving the metallic inner part (1), the elastomeric bearing body (2), and the tubular outer part (3), wherein by blocking or unblocking inflow of a fluid into at least one of the working chambers (4, 4') with an actuator, or by blocking or unblocking outflow of the fluid from at least one of the working chambers (4, 4'), the radial stiffness of the bush bearing is adjustable in a region of the working chambers (4, 4'), wherein the bearing body (2) is divided in the radial direction (r) by at least one insert (6) arranged in the bearing body (2) parallel to a bearing axis (12) into a radially inner spring packet (7) and a radially outer spring packet (8) with only the radially outer spring packet (8) receiving the working chambers (4, 4'), and that each of the working chambers (4, 4') is divided into several chamber sections ($9_1$-$9_n$) extending in the radial direction (r) inside the radially outer spring packet (8) and the outer part (3), and at least one chamber section (10) extending in the axial direction (a) and connecting the chamber sections ($9_1$-$9_n$) with one another, wherein the elastomeric bearing body (2), in the radially outer spring packet (8) bounded by the insert (6) and the outer part (3), is segmented, in the axial direction, by the chamber sections ($9_1$-$9_n$) of the working chambers (4, 4') that protrude into the elastomeric bearing body (2), wherein the tubular outer part (3) has a length, in the axial direction, defined between a first end and a second end located opposite to the first end of the tubular outer part (3), wherein at least a portion of the working chambers (4, 4') is located inside of a portion of the length of the tubular outer part (3) between the first and second ends of the tubular outer part (3), wherein the chamber sections ($9_1$-$9_n$) extend through the tubular outer part (3) at two or more positions along the length of the tubular outer part (3), thereby forming at least two distinct holes extending through the tubular outer part (3) at two or more positions along the length of the tubular outer part (3).

2. The elastomeric bush bearing according to claim 1, wherein the chamber section 10, connecting the chamber sections ($9_1$-$9_n$) to one another, is located within the length of the tubular outer part (3).

3. The elastomeric bush bearing according to claim 1, wherein the working chambers (4, 4') of the at least one working chamber pair are connected with one another by a channel, wherein the elastomeric bush bearing is configured to attain (i) a state of low radial stiffness in a region of the working chambers when one of the working chambers (4, 4') is emptied of fluid, (ii) a state of high radial stiffness in a region of the working chamber (4', 4) when one of the working chambers is filled with a fluid, and (iii) an intermediate radial stiffness in a region of working chambers (4, 4') of the chamber pair when the channel connecting the working chambers (4, 4') is unblocked.

4. The elastomeric bush bearing according to claim 1, wherein an equalization chamber with volume yieldability is formed axially above and/or below the working chambers (4, 4') of a chamber pair, and the radial stiffness of the bearing is switchable in the region of the working chamber (4, 4') of the respective chamber pair by alternatingly blocking and temporarily unblocking the channels connecting the equalization chamber with the working chambers (4, 4') of the chamber pair or the equalization chambers with a corresponding working chamber (4, 4') of the respective chamber pair, wherein in a first switching state of the bush bearing the inflow of fluid from the respective equalization chamber is blocked for both working chambers (4, 4') and in a second switching state the outflow of fluid into the respective equalization chamber is blocked for both working chambers (4, 4').

5. The elastomeric bush bearing according to claim 1, wherein for blocking or unblocking the fluid inflow into the working chambers (4, 4') and the fluid outflow from the working chambers (4, 4'), a switchable valve is arranged in a channel connecting the respective working chambers (4, 4') with each other or in each channel connecting such working chamber (4, 4') with an equalization chamber.

6. The elastomeric bush bearing according to claim 1, wherein the fluid is an electro-rheological fluid, into which at least one pair of electrodes to which a voltage of opposite polarity is applied protrudes, wherein the viscosity of the fluid can be changed by different voltages at the electrodes, so that depending on the voltage applied to the electrodes, the fluid can pass through a channel connecting the working chambers (4, 4') of a chamber pair with one another or a channel connecting such working chamber (4, 4') with an equalization chamber is passable.

7. The elastomeric bush bearing according to claim 1, wherein the fluid is a magneto-rheological fluid and means for generating a magnetic field passing through the fluid are arranged as actuators, wherein the viscosity of the fluid can be changed with the magnetic field, so that depending on the strength of the magnetic field acting on the fluid, the fluid can pass through a channel connecting the working chambers (4, 4') of a chamber pair with one another or a channel connecting a working chamber (4, 4') with an equalization chamber.

8. The elastomeric bush bearing according to claim 4, wherein the ratio between channel width and channel length for the channels connecting a respective working chamber (4, 4') with an equalization chamber is equal to or greater than 1.

9. The elastomeric bush bearing according to claim 1, wherein an additional insert (11) is vulcanized into the bearing body (2) in the region of the inner spring packet (7) that is bounded by the inner part (1) and the insert (6).

10. The elastomeric bush bearing according to claim 1, wherein each chamber section ($9_1$-$9_n$) is defined by a pair of walls extending radially between the at least one insert (6) and the at least one chamber section (10).

11. The elastomeric bush bearing according to claim 1, wherein the bearing body (2) is connected with the inner part (1) and the outer part (3) by vulcanization.

12. An elastomer bush bearing with a stiffness switchable in a radial direction (r), with a cylindrical metallic inner part (1), a tubular outer part (3) surrounding the inner part, an elastomeric bearing body (2) arranged between the inner part (1) and the outer part (3), and at least one pair of working chambers (4, 4'), arranged with an offset in relation to a circumferential direction (u) of the bush bearing, for receiving a fluid, as well as a bearing sleeve (5) receiving the metallic inner part (1), the elastomeric bearing body (2), and the tubular outer part (3), wherein by blocking or unblocking inflow of a fluid into at least one of the working chambers (4, 4') with an actuator, or by blocking or unblocking outflow of the fluid from at least one of the working chambers (4, 4'), the radial stiffness of the bush bearing is adjustable in a region of the working chambers (4, 4'), wherein the bearing body (2) is divided in the radial direction (r), by at least one insert (6) arranged in the bearing body (2) parallel to a bearing axis (12), into a radially inner spring packet (7) and a radially outer spring packet (8) with only the radially outer spring packet (8) receiving the working chambers (4, 4'), and that each of the working chambers (4, 4') is divided into several chamber sections ($9_1$-$9_n$) extending in the radial direction (r) inside the radially outer spring packet (8) and the outer part (3), and at least one chamber section (10) extending in the axial direction (a) and connecting the chamber sections ($9_1$-$9_n$) with one another, wherein the elastomeric bearing body (2), in the radially outer spring packet (8) bounded by the insert (6) and the outer part (3), is segmented, in the axial direction, by the chamber sections ($9_1$-$9_n$) of the working chambers (4, 4'), wherein the chamber sections ($9_1$-$9_n$) protrude into the outer spring packet (8) and contact the at least one insert (6).

* * * * *